(12) United States Patent
Fukui et al.

(10) Patent No.: US 11,117,506 B2
(45) Date of Patent: Sep. 14, 2021

(54) ROTARY HOLDER DEVICE

(71) Applicant: TOYODA GOSEI CO., LTD., Kiyosu (JP)

(72) Inventors: Naoyuki Fukui, Kiyosu (JP); Masanori Sakakibara, Kiyosu (JP); Etsuo Ozawa, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/840,676

(22) Filed: Apr. 6, 2020

(65) Prior Publication Data

US 2020/0324680 A1 Oct. 15, 2020

(30) Foreign Application Priority Data

Apr. 15, 2019 (JP) .............................. JP2019-077431

(51) Int. Cl.
*A47K 1/08* (2006.01)
*B60N 3/10* (2006.01)

(52) U.S. Cl.
CPC ............. *B60N 3/101* (2013.01); *B60N 3/105* (2013.01)

(58) Field of Classification Search
CPC .......... B60N 3/101; B60N 3/10; B60N 3/103; B60N 3/105; A47G 23/0216
See application file for complete search history.

(56) References Cited

U.S. PATENT DOCUMENTS

| 4,568,117 A * | 2/1986 | McElfish | B60N 3/102 224/280 |
| 6,431,391 B1* | 8/2002 | Kaupp | B60N 3/102 220/737 |
| 7,111,883 B1* | 9/2006 | Patel | B60R 7/04 296/24.34 |
| 10,071,691 B2* | 9/2018 | Parlow | B60R 7/04 |

FOREIGN PATENT DOCUMENTS

JP 2004-299430 A 10/2004

\* cited by examiner

*Primary Examiner* — Amy J. Sterling
(74) *Attorney, Agent, or Firm* — Posz Law Group, PLC (57) ABSTRACT

A rotary holder device includes: a vehicle interior member having an opening portion formed with a predetermined shape in an upper surface thereof; and a rotary body mounted on the vehicle interior member so as to be rotatable about a horizontal axis extending in a horizontal direction. The rotary body has a first holder portion and a second holder portion provided at rotation angle positions different from each other. The first holder portion has a first opening formed in a shape corresponding to the predetermined shape, and a first bottom wall facing the first opening at a position at the horizontal axis side with respect to the first opening. The second holder portion has a second opening formed in a rectangular shape, and a second bottom wall facing the second opening at a position at the horizontal axis side with respect to the second opening.

11 Claims, 9 Drawing Sheets

ROTARY HOLDER DEVICE

TECHNICAL FIELD

The present invention relates to a rotary holder device for holding a beverage container such as a can or a PET bottle and a portable terminal such as a smartphone or a mobile phone.

BACKGROUND ART

Conventionally, a rotary holder device that is mounted on a vehicle or the like to hold a beverage container such as a can or a PET bottle has been known (for example, JP2004-299430A). The rotary holder device described in JP2004-299430A includes a vehicle interior member such as an instrument panel or a center console of a vehicle, and a rotary body that is rotatable relative to the vehicle interior member. The vehicle interior member has an opening portion. The rotary body is mounted on the vehicle interior member so as to be rotatable about a horizontal axis. The rotary body has a holder opening formed with a size corresponding to the opening portion of the vehicle interior member, and has a tubular holder portion including a bottom wall and a side wall. When the holder opening is opened through the opening portion of the vehicle interior member, the bottom wall of the holder portion serves as a holding wall with which the bottom surface of a beverage container is brought into contact. When a rotation operation is performed about the horizontal axis, the back surface of the bottom wall is exposed to the outside through the opening portion, whereby the bottom wall of the holder portion serves as a lid portion that closes the opening portion of the vehicle interior member.

SUMMARY OF INVENTION

Technical Problem

Meanwhile, as objects to be held by holder devices, in addition to beverage containers such as cans and PET bottles, there are portable terminals such as smartphones and mobile phones in recent years. Generally, there is no space dedicated for placing a portable terminal, and a portable terminal is leaned against the above-described holder portion for a beverage container. However, assuming that a holder portion dedicated for a portable terminal is disposed on an upper panel portion of the vehicle interior member so as to be aligned horizontally with the holder portion for a beverage container, the area occupied by the holder portions on the upper panel portion is excessively large. In addition, assuming that a portable terminal is leaned against the holder portion for a beverage container, holding of the portable terminal is inevitably unstable.

The present invention has been made in view of such problems, and an object of the present invention is to provide a rotary holder device that saves a space for stably holding both a beverage container and a portable terminal.

Solution to Problem

An aspect of the present invention is directed to a rotary holder device including: a vehicle interior member having an opening portion formed with a predetermined shape in an upper surface thereof; and a rotary body mounted on the vehicle interior member so as to be rotatable about a horizontal axis extending in a horizontal direction, wherein the rotary body has a first holder portion and a second holder portion provided at rotation angle positions different from each other, the first holder portion has a first opening formed in a shape corresponding to the predetermined shape, and a first bottom wall facing the first opening at a position at the horizontal axis side with respect to the first opening, and the second holder portion has a second opening formed in a rectangular shape, and a second bottom wall facing the second opening at a position at the horizontal axis side with respect to the second opening.

With this configuration, a holder state where the first opening of the first holder portion is opened through the opening portion of the vehicle interior member and a holder state where the rectangular second opening of the second holder portion is opened through the opening portion of the vehicle interior member are selectively switched by rotating the rotary body. Therefore, a space for stably holding both a beverage container and a portable terminal each of which is an object to be held is saved.

DESCRIPTION OF EMBODIMENTS

A specific embodiment of the rotary holder device according to the present invention is described with reference to the drawings.

A rotary holder device 1 according to an embodiment is a holding device that is mounted on a vehicle, for example, to hold a beverage container such as a can or a PET bottle and also hold a portable terminal such as a smartphone or a mobile phone. As shown in FIG. 1, FIG. 2, FIG. 3, and FIG. 4, the rotary holder device 1 includes a vehicle interior member 10, a rotary body 30, an opening device 40, and a restricting device 50.

The vehicle interior member 10 is fixed to the vehicle body side. The vehicle interior member 10 has an exposed member 11 and side wall members 12 and 13. The exposed member 11 is exposed in the compartment of the vehicle and forms a part of an upper panel of a center console. The exposed member 11 is formed in a substantially quadrangular plate shape. An opening portion 14 is formed in the upper surface of the exposed member 11. The opening portion 14 is formed in a circular shape and has a diameter corresponding to the outer diameter of a beverage container that is an object to be held.

The side wall members 12 and 13 are wall portions facing the outer surface of the rotary body 30 and protect the rotary body 30. Each of the side wall members 12 and 13 is disposed outside the rotary body 30 below the exposed member 11. Each of the side wall members 12 and 13 is formed in a hemispherical shape so as to correspond to the outer surface of the rotary body 30. Each of the side wall members 12 and 13 has a shape in which an upper portion thereof is cut horizontally, and is disposed such that the upper end thereof is in contact with the back surface of the exposed member 11.

Figure 1:
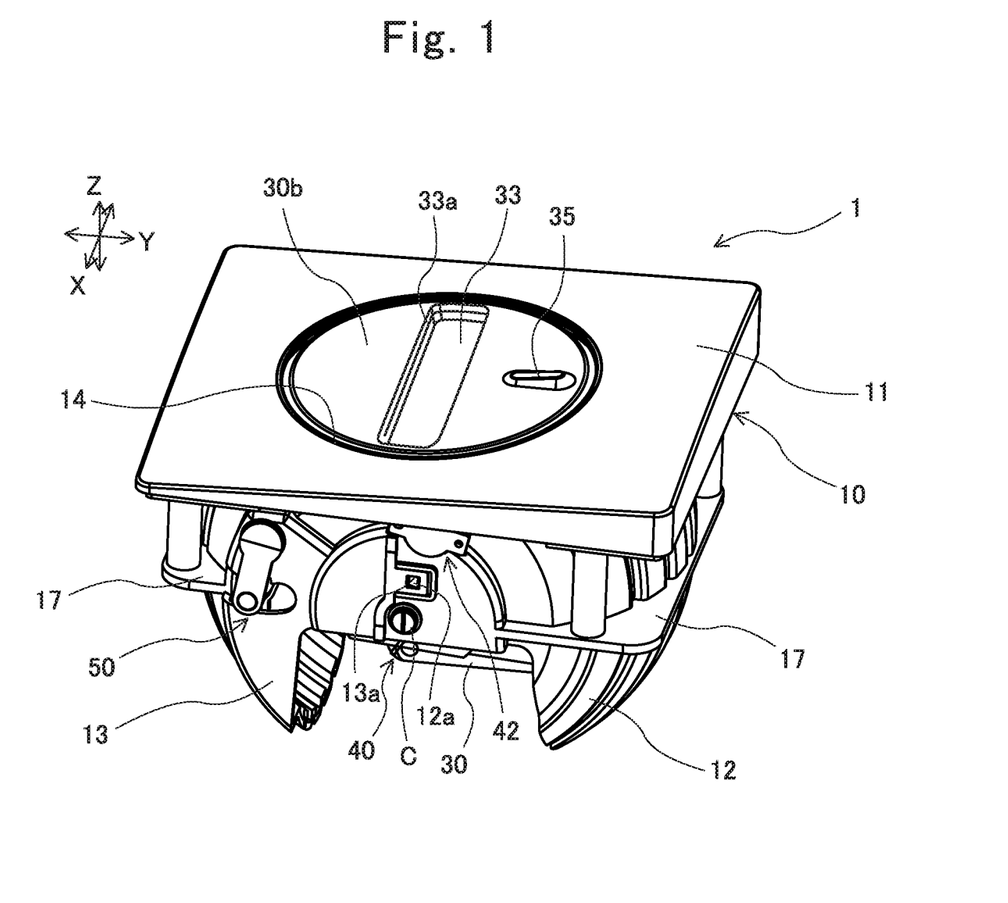
FIG. 1 is a perspective view in a terminal holder state of a rotary holder device according to an embodiment.
Figure 2:
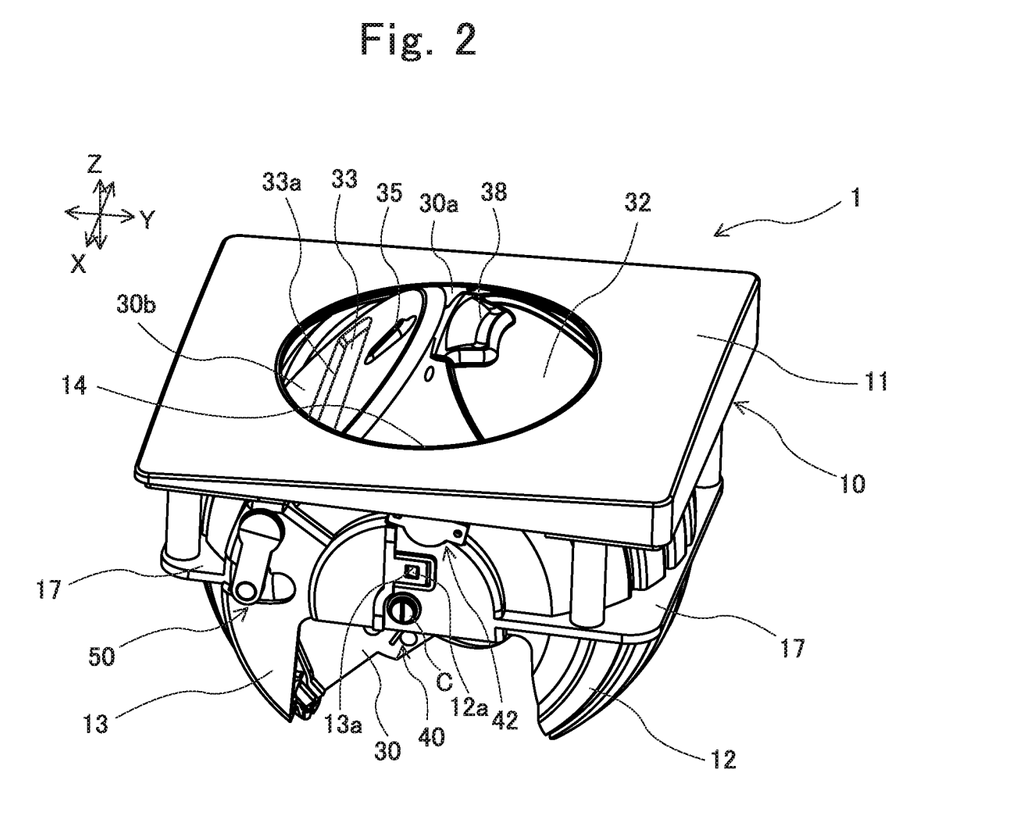
FIG. 2 is a perspective view in an intermediate state between the terminal holder state and a cup holder state of the rotary holder device according to the embodiment.
Figure 3:
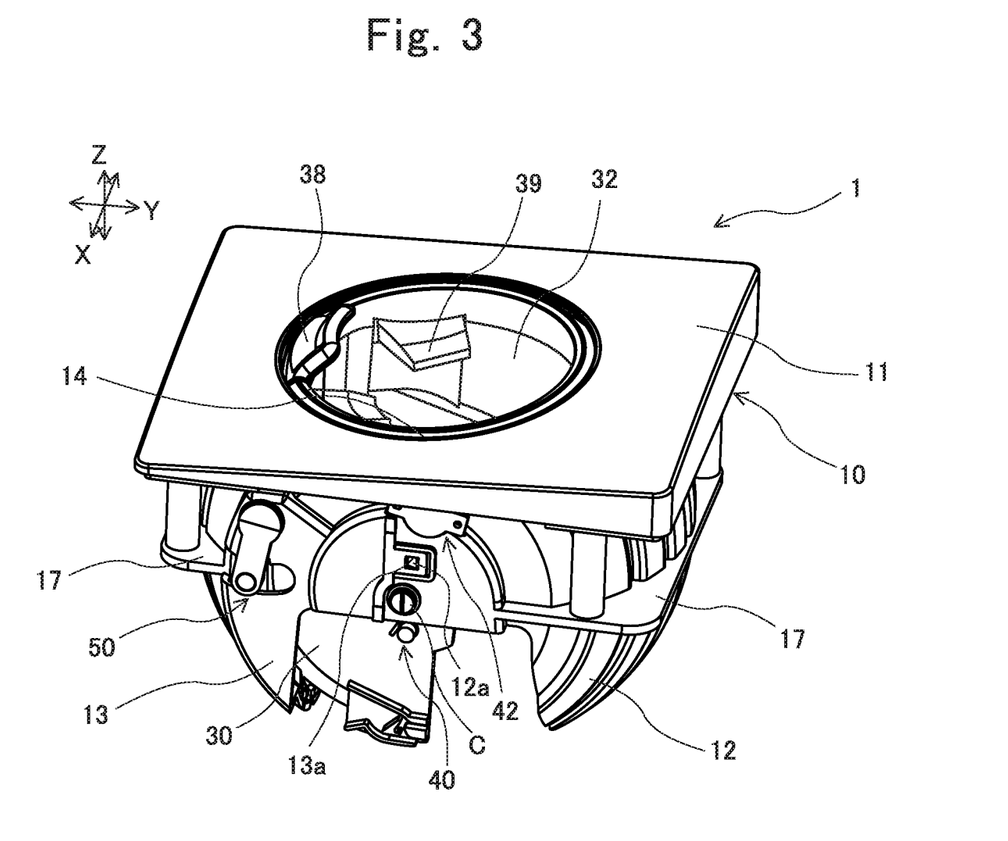
FIG. 3 is a perspective view in the cup holder state of the rotary holder device according to the embodiment.
Figure 4:
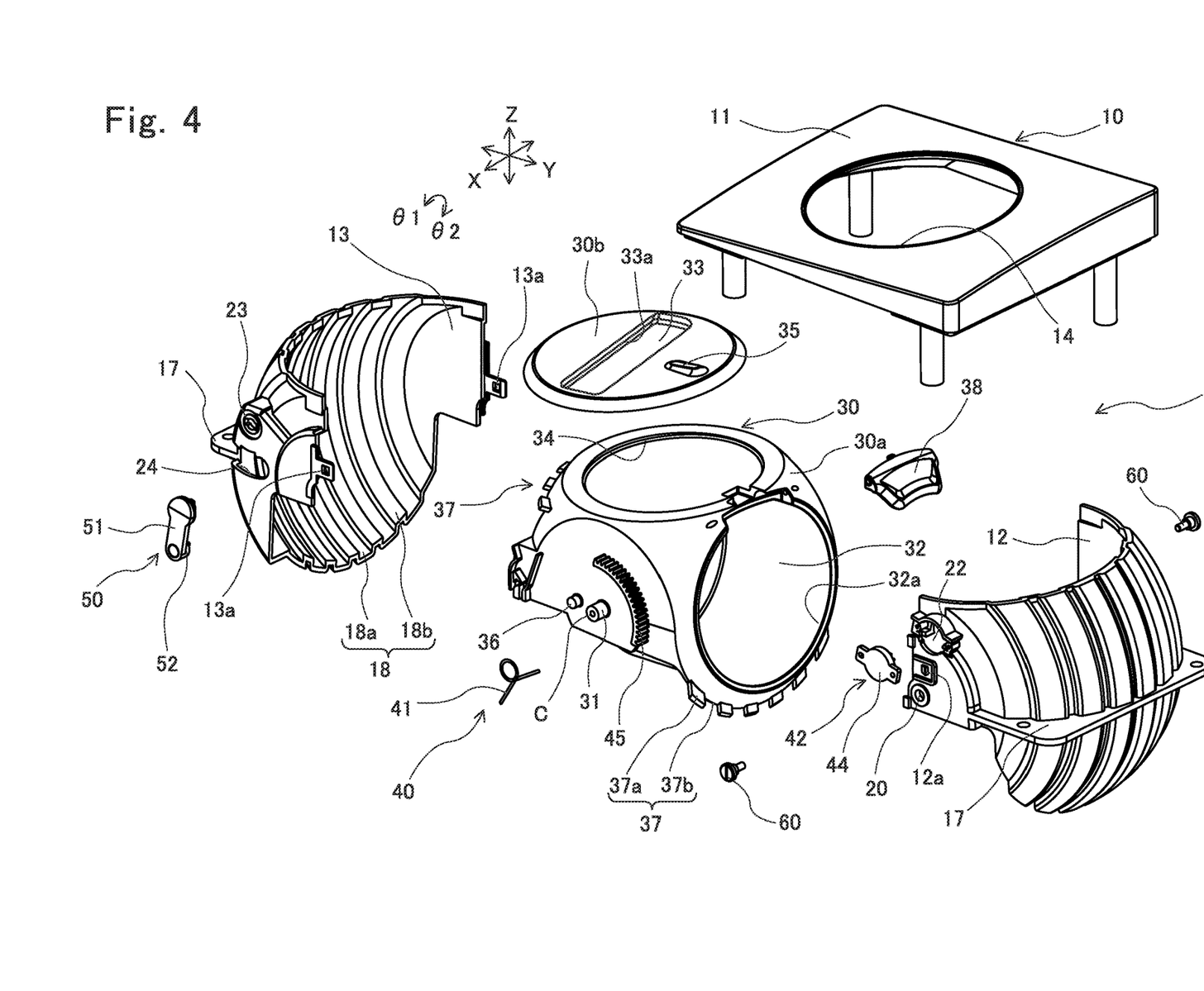
FIG. 4 is an exploded perspective view of the rotary holder device according to the embodiment.
Figure 5:
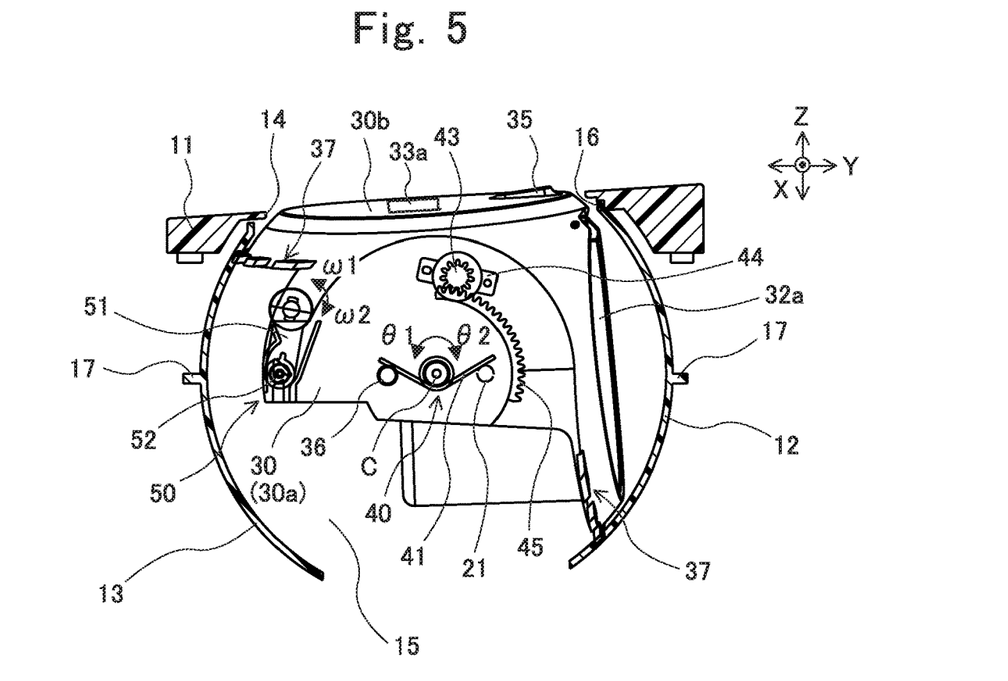
FIG. 5 shows a relationship between a vehicle interior member, a rotary body, an opening device, and a restricting device in the terminal holder state of the rotary holder device according to the embodiment.
Figure 6:
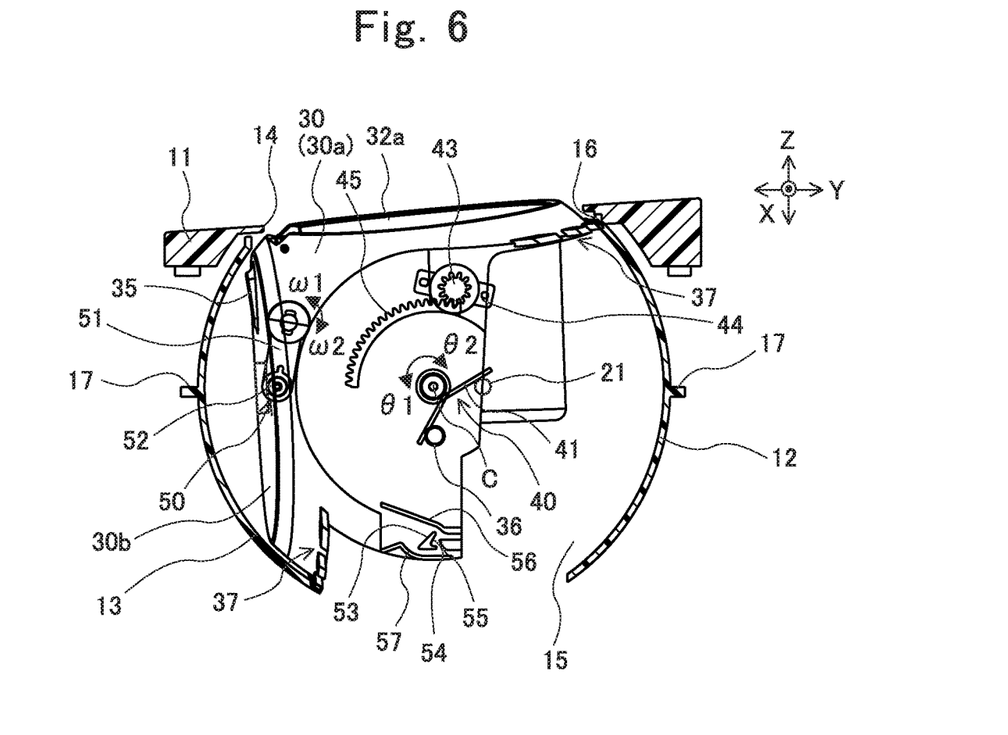
FIG. 6 shows a relationship between the vehicle interior member, the rotary body, the opening device, and the restricting device in the cup holder state of the rotary holder device according to the embodiment.

The side wall member 12 and the side wall member 13 are assembled to each other with the rotary body 30 therebetween so as to form a hollow spherical space 15 surrounding the outer surface of the rotary body 30 as shown in FIG. 5 and FIG. 6. When the side wall member 12 and the side wall member 13 are assembled to each other, an opening 16 having a diameter slightly larger than the opening portion 14 of the exposed member 11 is formed in the upper end of both side wall members 12 and 13 so as to correspond to the opening portion 14 of the exposed member 11, and the hollow spherical space 15 is formed so as to surround the rotary body 30. Each of the side wall members 12 and 13 is fixed to the exposed member 11 with a flange-shaped mounting portion 17 by bolting or the like.

Each of the side wall members 12 and 13 has a comb tooth portion 18. Each comb tooth portion 18 is an uneven portion formed along the hemispherical inner surface of the side wall members 12 or 13. The comb tooth portion 18 has recesses 18a and projections 18b aligned alternately in a horizontal direction X. Each of the recesses 18a and the projections 18b of the comb tooth portion 18 extend in the up-down direction and has a length that allows a later-described comb tooth portion of the rotary body 30 to be constantly in mesh therewith. Each of the recesses 18a and the projections 18b is formed so as to have a predetermined width corresponding to the size of a falling object that is to be a later-described object to be scooped up. Hereinafter, the side wall member 12 is referred to as first side wall member 12, and the side wall member 13 is referred to as second side wall member 13.

A claw portion 12a is formed on the outer surface of the first side wall member 12. The claw portion 12a is provided at each end side, of the first side wall member 12, in the axial direction of a horizontal axis C extending in the horizontal direction X, and projects outward in the axial direction. A hole 13a is formed in the outer surface of the second side wall member 13. The hole 13a is provided in each of projections that are provided at both end sides, of the second side wall member 13, in the axial direction of the horizontal axis C so as to project in a horizontal direction Y at the first side wall member 12 side, and is a through hole penetrating in the axial direction in the horizontal axis C. The first side wall member 12 and the second side wall member 13 are assembled to each other by bringing the claw portions 12a at both end portions in the axial direction of the horizontal axis C into engagement with the holes 13a.

The rotary body 30 is a rotary member that is rotatable relative to the vehicle interior member 10. The rotary body 30 is mounted on the vehicle interior member 10 so as to be rotatable about the horizontal axis C. The rotary body 30 is formed in a spherical shape as a whole. A shaft portion 31 is provided on the outer surface of the rotary body 30 so as to extend outward in the axial direction. The shaft portion 31 is provided at each end side, of the rotary body 30, in the axial direction of the horizontal axis C. A shaft hole 20 is provided in the first side wall member 12 so as to penetrate in the axial direction of the horizontal axis C. The shaft hole 20 is provided at each end side portion, of the first side wall member 12, in the axial direction of the horizontal axis C. Each shaft portion 31 is supported by a screw 60 penetrating the shaft hole 20 of the first side wall member 12, whereby the rotary body 30 is supported by the first side wall member 12 and further by the vehicle interior member 10.

Figure 7:
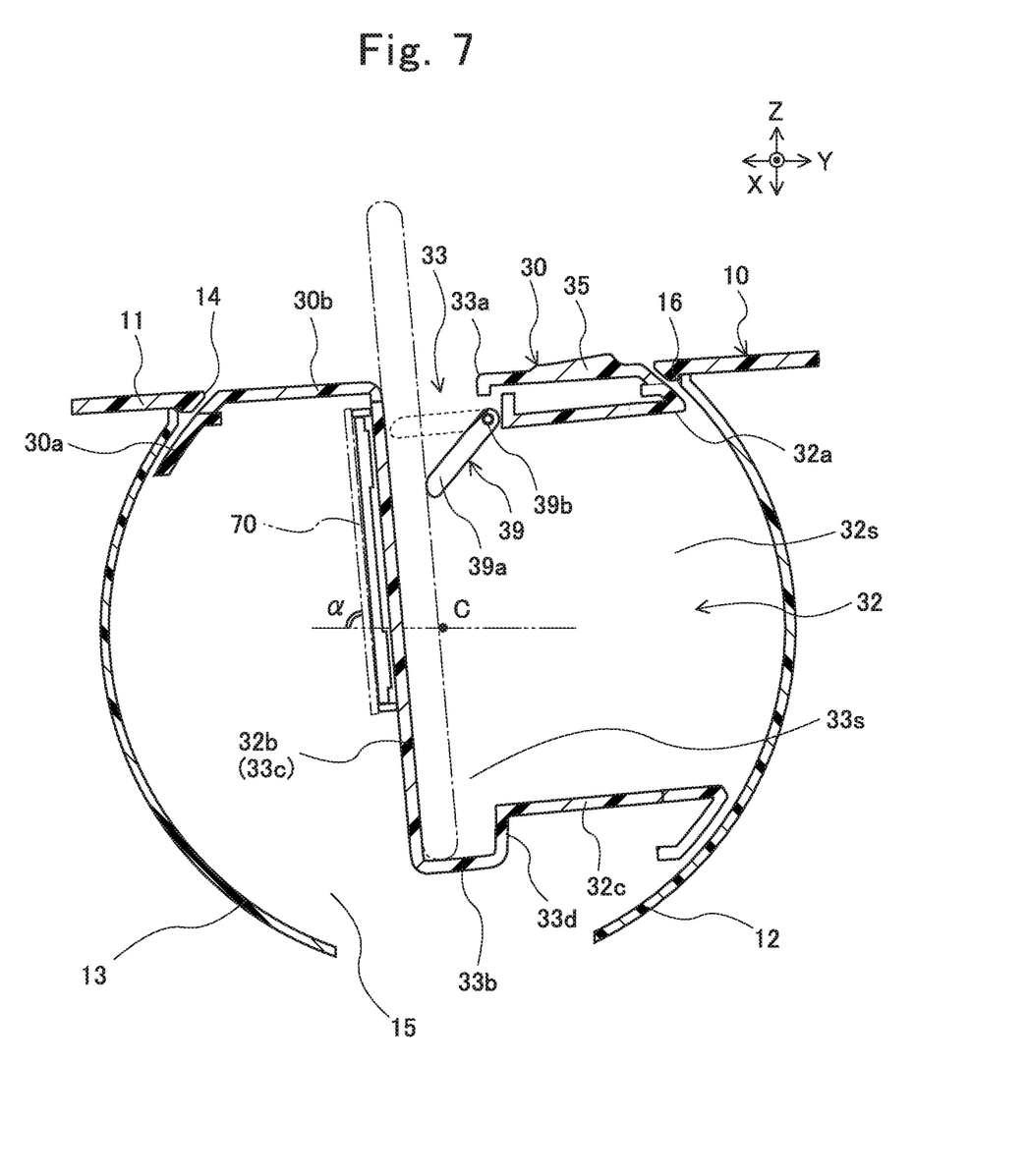
FIG. 7 shows a relationship between the vehicle interior member and the rotary body in the terminal holder state of the rotary holder device according to the embodiment.
Figure 8:
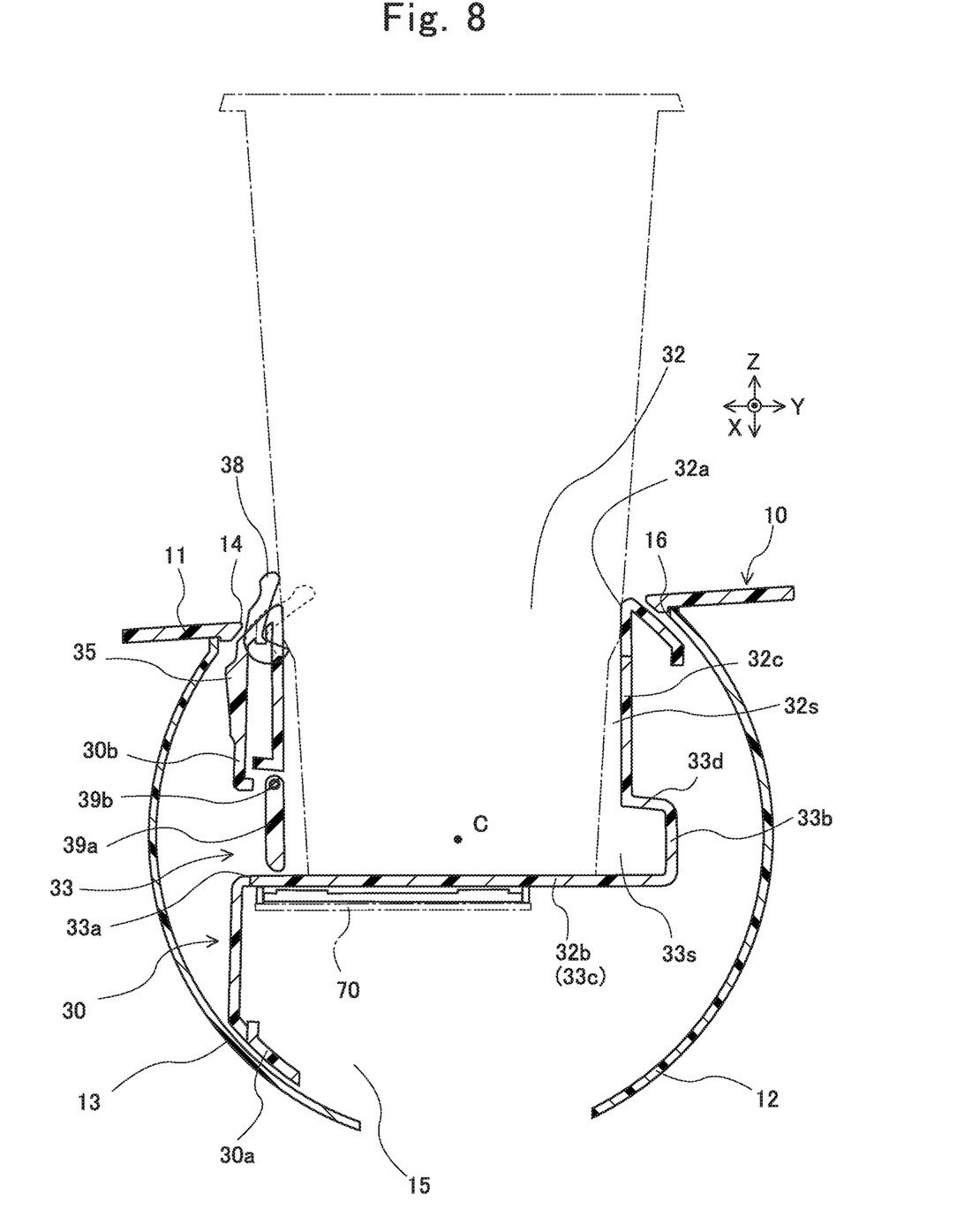
FIG. 8 shows a relationship between the vehicle interior member and the rotary body in the cup holder state of the rotary holder device according to the embodiment.

The rotary body 30 has a first holder portion 32 and a second holder portion 33. The first holder portion 32 and the second holder portion 33 are provided at rotation angle positions different from each other in a rotation direction about the horizontal axis C in the entirety of the rotary body 30. The rotation angle position at which the first holder portion 32 is provided and the rotation angle position at which the second holder portion 33 is provided are different from each other, for example, by about 90°. Specifically, this angle difference (hereinafter, referred to as arrangement angle difference a) is equal to or less than 90° with the horizontal axis C as a center as shown in FIG. 7, and, for example, equal to or greater than 70°. When the rotary body 30 rotates about the horizontal axis C by the arrangement angle difference a from a state where the first holder portion 32 is located at an upper portion (hereinafter, this state is referred to as cup holder state: a state shown in FIG. 8), the rotary body 30 shifts to a state where the second holder portion 33 is located at the upper portion (hereinafter, this state is referred to as terminal holder state: a state shown in FIG. 7).

The first holder portion 32 forms a holding space 32s in which a beverage container, which is an object to be held, is held in the cup holder state. The holding space 32s of the first holder portion 32 only needs to have a shape including at least a cylindrical shape conforming to the outer shape of a beverage container which is an object to be held. The first holder portion 32 has a first opening 32a, a first bottom wall 32b, and a first side wall 32c.

The first opening 32a is an inlet/outlet connected to the holding space 32s. The first opening 32a is formed in a circular shape conforming to the opening portion 14 of the exposed member 11. The first opening 32a has a size conforming to the opening portion 14. Specifically, the first opening 32a has a diameter corresponding to the diameter of the opening portion 14. The vehicle interior member 10 and the rotary body 30 are formed such that a gap in a radial direction formed between the peripheral edge of the opening portion 14 of the exposed member 11 in the vehicle interior member 10 and the rotary body 30 in a state where the first opening 32a is opened through the opening portion 14 (that is, the cup holder state) is less than a predetermined distance.

That is, in the cup holder state, a gap in the radial direction is formed between the peripheral edge of the opening portion 14 of the exposed member 11 in the vehicle interior member 10 and the rotary body 30 (specifically, an upper end portion of the first holder portion 32, etc.). This gap in the radial direction is less than the predetermined distance.

The predetermined distance is, for example, the diameter of a ball used in safety standards specified in Europe, Japan, etc., for internal projections of vehicle interior components, and is, for example, 165 mm. However, for ensuring safety, the above gap in the radial direction is preferably a distance (for example, less than 2.5 mm) that does not allow a finger of a person to enter the gap. In addition, for ensuring smooth rotation of the rotary body 30 relative to the vehicle interior member 10, the gap in the radial direction needs to be set to a distance that prevents the vehicle interior member 10 and the rotary body 30 from coming into contact with each other and hindering the rotation.

The peripheral edge of the first opening 32a in the first holder portion 32 is formed so as to be rounded over the entire circumference. Specifically, the peripheral edge of the first opening 32a in the first holder portion 32 is formed in a shape that meets an internal projection requirement used in the above safety standards. The internal projection requirement is that a radius of curvature is equal to or greater than 2.5 mm or equal to or greater than 3.2 mm.

The first bottom wall 32b is a support wall that supports a beverage container when the bottom surface of the beverage container is brought into contact with the wall. The first bottom wall 32b is formed such that a surface thereof with which a beverage container is brought into contact is a flat surface and this surface horizontally spreads in the cup holder state. The first bottom wall 32b faces the first opening 32a at a position at the horizontal axis C side with respect to the first opening 32a.

The first side wall 32c is a support wall that extends along a side surface of a beverage container and that supports the beverage container. The first side wall 32c is formed in a substantially cylindrical shape. The first side wall 32c extends from the peripheral edge of the first opening 32a toward the first bottom wall 32b side. The first side wall 32c is formed so as to be integrally connected to the first bottom wall 32b, but a part in a circumferential direction of the first side wall 32c is formed so as to be separated from the first bottom wall 32b.

The second holder portion 33 forms a holding space 33s in which a portable terminal, which is an object to be held, is held in the terminal holder state. The holding space 33s of the second holder portion 33 communicates with the holding space 32s of the first holder portion 32 and is shared with a part of the holding space 32s of the first holder portion 32. The holding space 33s of the second holder portion 33 only needs to have a shape including at least a thin rectangular parallelepiped shape conforming to the outer shape of a portable terminal, which is an object to be held, in a state where the portable terminal is leaned. The second holder portion 33 has a second opening 33a, a second bottom wall 33b, a second side wall 33c, and a restriction portion 33d.

The second opening 33a is an inlet/outlet connected to the holding space 33s. The second opening 33a is formed in a rectangular shape. The second opening 33a has an opening width larger than the maximum thickness of a portable terminal which is an object to be held. The second opening 33a is provided in a lid member 30b mounted on a main body member 30a of the rotary body 30. In addition to the first opening 32a of the first holder portion 32, a circular opening 34 is provided in the main body member 30a of the rotary body 30. The lid member 30b is formed in a planar shape and in a circular shape so as to correspond to the opening 34 of the main body member 30a. The lid member 30b is disposed so as to close the opening 34 of the main body member 30a and is mounted on the main body member 30a such that the second opening 33a thereof is connected to the opening 34. The lid member 30b is formed so as to be flush with the front surface of the exposed member 11 when being disposed so as to close the opening 34. The second opening 33a is provided in the lid member 30b separate from the main body member 30a of the rotary body 30, but may be integrally formed in the rotary body 30 having the first opening 32a formed therein.

The peripheral edge of the second opening 33a in the second holder portion 33 is formed so as to be rounded over the entire circumference. Specifically, the peripheral edge of the second opening 33a in the second holder portion 33 is formed in a shape that meets an internal projection requirement used in the above safety standards. The internal projection requirement is that a radius of curvature is equal to or greater than 2.5 mm or equal to or greater than 3.2 mm.

An operation mark portion 35 is provided on the front surface of the lid member 30b. The operation mark portion 35 is a mark that indicates a portion that is to be touched by an occupant such as a driver when the occupant performs an opening operation from the terminal holder state to the cup holder state as described later. The operation mark portion 35 projects outward from the front surface of the lid member 30b of the second holder portion 33. The operation mark portion 35 is provided on a portion closer to the first holder portion 32 than to the second opening 33a (that is, a portion at a later-described rotation direction θ2 side), of the circular front surface of the lid member 30b.

For achieving an opening operation with small operation force, the operation mark portion 35 is preferably disposed on an end portion closer to the first holder portion 32. In addition, instead of the projection projecting outward from the front surface of the lid member 30b, the operation mark portion 35 may be, for example, a portion recessed from the front surface of the lid member 30b, a seal that has a color totally different from that of the other front surface of the lid member 30b, or the like.

The vehicle interior member 10 and the rotary body 30 are formed such that a gap in the radial direction formed between the peripheral edge of the opening portion 14 of the exposed member 11 in the vehicle interior member 10 and the peripheral edge of the lid member 30b in a state where the lid member 30b is disposed at a position at which the opening portion 14 is closed and the second opening 33a is opened through the opening portion 14 (that is, the terminal holder state) is less than a predetermined distance. That is, in the terminal holder state, a gap in the radial direction less than the predetermined distance is formed between the peripheral edge of the opening portion 14 in the vehicle interior member 10 and the peripheral edge of the lid member 30b.

The above predetermined distance is, for example, the diameter of a ball used in safety standards specified in Europe, Japan, etc., for internal projections of vehicle interior components as described above, and is, for example, 165 mm. However, for ensuring safety, the above gap in the radial direction is preferably a distance (for example, less than 2.5 mm) that does not allow a finger of a person to enter the gap. In addition, the gap in the radial direction is set to a distance that, during rotation of the rotary body 30 relative to the vehicle interior member 10, prevents the vehicle interior member 10 and the rotary body 30 from coming into contact with each other and hindering the rotation.

The second bottom wall 33b is a support wall that supports a portable terminal when the bottom surface of the portable terminal is brought into contact with the wall. The second bottom wall 33b is formed such that a surface thereof with which a portable terminal is brought into contact is a flat surface and this surface horizontally spreads in the terminal holder state. The second bottom wall 33b has a width larger than the maximum thickness of a portable terminal which is an object to be held. The second bottom wall 33b faces the second opening 33a at a position at the horizontal axis C side with respect to the second opening 33a. The second bottom wall 33b is provided at the location of the first holder portion 32 where the part in the circumferential direction of the first side wall 32c is separated from the first bottom wall 32b. The second bottom wall 33b is located outward in the radial direction of the first side wall 32c with respect to the center of the holding space 32s of the first holder portion 32. The holding space 33s of the second holder portion 33 includes a space that is formed by cutting the first side wall 32c and that spreads outward in the radial direction from the holding space 32s of the first holder portion 32.

The second side wall 33c is a support wall that extends along at least the back surface of a portable terminal and that supports the portable terminal. The second side wall 33c only needs to be provided at a surface facing at least the back surface or the front surface of the portable terminal, among surfaces surrounding four surfaces of the portable terminal including the back surface and the front surface, and, for example, the second side wall 33c may be provided at three surfaces including surfaces facing the side surfaces of the portable terminal, such that a U cross-sectional shape is formed. The second side wall 33c extends from the peripheral edge of the second opening 33a toward the second bottom wall 33b side.

The second side wall 33c is shared with the first bottom wall 32b of the first holder portion 32. That is, the first bottom wall 32b is a support wall that supports the bottom surface of a beverage container held in the first holder portion 32 in the cup holder state, and is also a support wall that serves as the second side wall 33c and supports the back surface or the front surface of a portable terminal held in the second holder portion 33 in the terminal holder state. The second side wall 33c is formed such that a surface thereof with which the back surface or the front surface of a portable terminal is brought into contact is a flat surface and this surface is inclined at an angle of 90° or less relative to a horizontal plane in the terminal holder state. The second side wall 33c is integrally connected to the second bottom wall 33b.

A power feeder 70 is mounted on the second side wall 33c, that is, the first bottom wall 32b. The power feeder 70 is a device that wirelessly supplies power to a portable terminal held in the second holder portion 33, and mainly has a feeding coil. The power feeder 70 is disposed at the back surface side of the first bottom wall 32b opposite to the front surface side of the first bottom wall 32b with which the bottom portion of a beverage container is bought into contact (that is, at the back surface side of the second side wall 33c opposite to the front surface side of the second side wall 33c with which the back surface or the front surface of a portable terminal is bought into contact). The power feeder 70 is connected to a power source (not shown) via a wire (not shown).

The restriction portion 33d restricts the bottom portion of a portable terminal held in the second holder portion 33 from sliding and moving relative to the second bottom wall 33b. The restriction portion 33d is a wall portion formed so as to connect the second bottom wall 33b and the first side wall 32c, and is formed so as to stand from the second bottom wall 33b and face the second side wall 33c. The restriction portion 33d prevents the bottom portion of a portable terminal from sliding on the second bottom wall 33b by more than a predetermined amount.

The rotary body 30 rotates about the horizontal axis C such that a state where the first opening 32a of the first holder portion 32 is opened through the opening portion 14 of the exposed member 11 (cup holder state) and a state where the second opening 33a of the second holder portion 33 is opened through the opening portion 14 (terminal holder state) are switched. The angle (that is, the arrangement angle difference) a by which the rotary body 30 rotates about the horizontal axis C between the cup holder state and the terminal holder state is equal to or less than 90° (specifically, 85° or the like).

The opening device 40 rotates the rotary body 30 to the cup holder state to open the first opening 32a through the opening portion 14 when the rotary holder device 1, that is, the rotary body 30, is in the terminal holder state. The opening device 40 has a second biasing member 41. The second biasing member 41 is, for example, a torsion spring. An engagement portion 36 is provided on the outer surface of the rotary body 30 at one end side in the axial direction of the horizontal axis C (at the near side in FIG. 1 to FIG. 4) so as to project outward in the axial direction. In addition, an engagement portion 21 is provided on the inner surface of the first side wall member 12 at the one end side in the axial direction of the horizontal axis C so as to project inward in the axial direction. The second biasing member 41 is mounted such that one end portion thereof is brought into engagement with the engagement portion 21 of the first side wall member 12 and another end portion thereof is brought into engagement with the engagement portion 36 of the rotary body 30. The second biasing member 41 generates biasing force that biases the rotary body 30 in a rotation direction θ1 from the terminal holder state side to the cup holder state side.

The opening device 40 has a damper device 42. The damper device 42 is a one-way clutch damper that reduces the speed of the rotary body 30 when the rotary body 30 is biased by the second biasing member 41 in the rotation direction θ1 from the terminal holder state side to the cup holder state side. The damper device 42 has a disc gear member 43. The disc gear member 43 is a disk-shaped member having a gear with recesses and projections formed on an outer circumferential surface thereof and extending in a radial direction thereof. The disc gear member 43 is rotatably supported by a holding member 44. The holding member 44 is mounted and fixed to a mounting portion 22 provided to the first side wall member 12.

The damper device 42 has an arc gear portion 45. The arc gear portion 45 extends in an arc shape around the horizontal axis C at an end portion, of the rotary body 30, in the axial direction of the horizontal axis C, and has a gear with recesses and projections extending in a radial direction thereof. The gear of the disc gear member 43 and the gear of the arc gear portion 45 are in mesh with each other. Rotation of the rotary body 30 about the horizontal axis C proceeds, while the rotary body 30 is decelerated, in a state where the gear of the disc gear member 43 and the gear of the arc gear portion 45 are in mesh with each other.

The restricting device 50 locks the rotary body 30 in the terminal holder state as shown in FIG. 6 and unlocks the rotary body 30. The restricting device 50 has an arm member 51 extending in a belt shape. The arm member 51 is swingably mounted on a mounting portion 23 provided to the second side wall member 13. One end of the arm member 51 is supported by the mounting portion 23. A projection 52 is provided at the other end of the arm member 51 so as to extend in the axial direction of the horizontal axis C. The projection 52 is formed in a columnar or cylindrical shape. A hole 24 is provided in the second side wall member 13 so as to penetrate in the axial direction of the horizontal axis C. The projection 52 is disposed so as to extend from the outer side of the second side wall member 13 through the hole 24 to the inner side of the second side wall member 13.

The restricting device 50 has a first switching slope portion 53, a stopper portion 54, a second switching slope portion 55, and guide portions 56 and 57. Each of the first switching slope portion 53, the stopper portion 54, the second switching slope portion 55, and the guide portions 56 and 57 is provided on the outer surface of the rotary body 30 at the one end side in the axial direction of the horizontal axis C and projects outward in the axial direction. Each of the first switching slope portion 53, the stopper portion 54, the second switching slope portion 55, and the guide portions 56 and 57 is disposed and formed such that this portion is brought into contact with the projection 52 of the arm member 51 at a necessary timing.

The first switching slope portion 53 swings the arm member 51 about one end side of the arm member 51 in a swing direction ω1 by the projection 52 coming into contact with the first switching slope portion 53 while the rotary body 30 is rotating about the horizontal axis C in the rotation direction θ2 to the terminal holder state side from the cup holder state. The stopper portion 54 restricts the rotary body 30 from rotating back about the horizontal axis C in the rotation direction θ1, by the projection 52 coming into contact with the stopper portion 54 after the rotary body 30 reaches the terminal holder state. The second switching slope portion 55 swings the arm member 51 about the one end side of the arm member 51 in a swing direction ω2 opposite to the swing direction ω1, by the projection 52 coming into contact with the second switching slope portion 55 when the rotary body 30 further rotates in the rotation direction θ2 from the cup holder state side to the terminal holder state side after the rotary body 30 reaches the terminal holder state.

The guide portion 56 guides the projection 52 after the projection 52 comes into contact with the first switching slope portion 53 until the projection 52 comes into contact with the stopper portion 54. The guide portion 57 guides the projection 52 after the projection 52 comes into contact with the second switching slope portion 55 until reaching the cup holder state. In addition, the second switching slope portion 55 and the guide portion 57 are formed such that further rotation of the rotary body 30 is restricted by the projection 52 coming into contact with these portions when the rotary body 30 further rotates in the rotation direction θ2 by more than a predetermined amount after the rotary body 30 rotates in the rotation direction θ2 from the cup holder state and reaches the terminal holder state.

A comb tooth portion 37 is provided on the outer surface of the rotary body 30. The comb tooth portion 37 is provided at two locations corresponding to the comb tooth portions 18 of the side wall members 12 and 13. Specifically, the comb tooth portion 37 is provided on the peripheral edge of the first opening 32a at the rotation direction θ2 side with respect to the first holder portion 32 in the rotary body 30, and is also provided on the peripheral edge at the rotation direction θ1 side with respect to the second holder portion 33 in the rotary body 30. Each comb tooth portion 37 is an uneven portion including projections that project outward from the outer surface of the rotary body 30. The comb tooth portion 37 is in mesh with the comb tooth portion 18. Projections 37a and recesses 37b of the comb tooth portion 37 are alternately aligned in the horizontal direction so as to correspond to the recesses 18a and the projections 18b of the comb tooth portion 18 of the side wall member 12 or 13. Each of the projections 37a and the recesses 37b is formed so as to have a predetermined width corresponding to the size of a falling object that is to be a later-described object to be scooped up.

The rotary body 30 has a switching knob 38. The switching knob 38 is mounted on the main body member 30a of the rotary body 30. The switching knob 38 is an operation assisting portion that assists an occupant in performing an operation of rotating the rotary body 30 in the rotation direction 92 to the terminal holder state side from the cup holder state where the first opening 32a is opened through the opening portion 14. The switching knob 38 is formed in a wing shape such that an operation of rotating the rotary body 30 in the rotation direction θ2 is easily performed.

The switching knob 38 is provided near the boundary between the first holder portion 32 and the second holder portion 33 in the rotary body 30, that is, on the peripheral edge of the first opening 32a at the rotation direction θ1 side with respect to the first holder portion 32, so as to project outward. The switching knob 38 is housed in the spherical space 15, which is located below the opening portion 14, in the terminal holder state where the second opening 33a of the second holder portion 33 is opened through the opening portion 14, and projects above the opening portion 14 in the cup holder state where the first opening 32a of the first holder portion 32 is opened through the opening portion 14.

The switching knob 38 is mounted on the rotary body 30 so as to be swingable about an axis parallel to the horizontal axis C. The switching knob 38 is biased about the axis parallel to the horizontal axis C in a direction in which the first opening 32a is closed and that is a direction to the center side of the first opening 32a. With this structure, in accordance with the outer diameter of a beverage container inserted into the first holder portion 32, the switching knob 38 advances or retracts such that an amount by which the switching knob 38 projects to the center side of the first opening 32a is changed. That is, in accordance with a beverage container inserted into the first holder portion 32, the switching knob 38 provides force pressing toward a side in the circumferential direction opposite to the switching knob 38 across the first opening 32a, to the beverage container by an end portion of the switching knob 38 coming into contact with the outer surface of the beverage container. For holding a small-sized beverage container in the first holder portion 32, increasing the size of the switching knob 38 (specifically, an amount by which the switching knob 38 projects outward) is effective.

The rotary body 30 has a pressing mechanism 39. The pressing mechanism 39 presses a portable terminal inserted into the second opening 33a, toward the front surface side of the first bottom wall 32b, that is, the second side wall 33c. The pressing mechanism 39 has a swinging member 39a and a first biasing member 39b. The swinging member 39a swings about an axis parallel to the horizontal axis C. The swinging member 39a is mounted on the back surface side of the lid member 30b of the rotary body 30. The swinging member 39a is disposed at a position at which the second opening 33a is opened and closed, and swings so as to open and close the second opening 33a. The swinging member 39a is formed in a plate shape corresponding to the size of the second opening 33a.

The first biasing member 39b generates biasing force that biases and swings the swinging member 39a in a direction in which the second opening 33a is closed. Owing to the biasing force of the first biasing member 39b, in accordance with the width of a portable terminal held in the second holder portion 33, the swinging member 39a advances or retracts such that an amount by which the swinging member 39a projects to the second side wall 33c side is changed. That is, owing to the biasing force of the first biasing member 39b, in accordance with a portable terminal held in the second holder portion 33, the swinging member 39a provides force pressing toward the second side wall 33c side, to the portable terminal by an end portion of the swinging member 39a coming into contact with the front surface or the back surface of the portable terminal.

Next, operation of the rotary holder device 1 is described.

In the rotary holder device 1, as shown in FIG. 5, in the terminal holder state where the second opening 33a of the second holder portion 33 of the rotary body 30 is opened through the opening portion 14 of the vehicle interior member 10, the rotary body 30 is restricted from rotating back about the horizontal axis C in the rotation direction θ1 to the cup holder state side, by the projection 52 of the arm member 51, which is mounted on the second side wall member 13 of the vehicle interior member 10, coming into contact with the stopper portion 54 of the rotary body 30. Thus, in the terminal holder state, for example, even when vehicle vibration or the like occurs, the terminal holder state is maintained. In the terminal holder state, the rotary body 30 is permitted to slightly rotate about the horizontal axis C in the rotation direction θ2.

In the above terminal holder state, a gap in the radial direction less than the predetermined distance is formed between the peripheral edge of the opening portion 14 in the exposed member 11 of the vehicle interior member 10 and the lid member 30b of the rotary body 30. As described above, the predetermined distance is, for example, the diameter of a ball used in the safety standards specified in Europe, Japan, etc., for internal projections of vehicle interior components. Thus, the peripheral edge of the opening portion 14 in the exposed member 11 does not need to be formed in a shape that meets the internal projection requirement. Therefore, the design of the rotary holder device 1 in the terminal holder state is prevented from being impaired, and a flat feeling of the front surface of the rotary holder device 1 in the terminal holder state is realized.

When switching the rotary holder device 1 from the terminal holder state to the cup holder state where the first opening 32a of the first holder portion 32 of the rotary body 30 is opened through the opening portion 14, an occupant such as a driver presses the second holder portion 33 downward. Specifically, the occupant touches the operation mark portion 35 on the front surface of the second holder portion 33 and presses the operation mark portion 35 downward. When the second holder portion 33 is pressed downward in the terminal holder state, the rotary body 30 rotates about the horizontal axis C in the rotation direction θ2.

When the rotary body 30 is rotated in the rotation direction θ2 in the terminal holder state, the arm member 51 is swung about the one end side thereof in the swing direction ω2 by the projection 52 of the arm member 51 coming into contact with the second switching slope portion 55 of the rotary body 30 during the rotation. When the downward pressing of the second holder portion 33 is released in a state where the arm member 51 is swung in the swing direction ω2, the rotary body 30 is biased by the biasing force of the second biasing member 41 to rotate in the rotation direction θ1. The rotation of the rotary body 30 is made while the speed of the rotary body 30 is reduced by the damper device 42. Then, when the rotary body 30 rotates about the horizontal axis C by about 90°, the rotary holder device 1 comes into the cup holder state where the first opening 32a of the first holder portion 32 is opened through the opening portion 14 as shown in FIG. 6.

In the cup holder state, a beverage container that is an object to be held such as a can or a PET bottle is held within the first holder portion 32 of the rotary body 30. In addition, in the cup holder state, a gap in the radial direction less than the predetermined distance is formed between the peripheral edge of the opening portion 14 in the exposed member 11 of the vehicle interior member 10 and the rotary body 30. Thus, the peripheral edge of the opening portion 14 in the exposed member 11 does not need to be in a shape that meets the internal projection requirement. Therefore, the design of the rotary holder device 1 in the cup holder state is prevented from being impaired.

In addition, the first opening 32a has a diameter smaller than the diameter of the opening portion 14 of the exposed member 11. The peripheral edge of the first opening 32a is formed so as to be rounded over the entire circumference. Specifically, the peripheral edge of the first opening 32a is formed in a shape that meets the internal projection requirement which is used in the safety standards for internal projections of vehicle interior components and which is that a radius of curvature is equal to or greater than 2.5 mm or equal to or greater than 3.2 mm. Therefore, in the cup holder state, safety of a vehicle interior component at the time of a collision or the like is ensured.

When switching the rotary holder device 1 from the cup holder state to the terminal holder state, an occupant such as a driver presses the switching knob 38 in the rotation direction θ2. When the switching knob 38 is pressed in the rotation direction θ2, the rotary body 30 rotates about the horizontal axis C in the rotation direction θ2. When the rotary body 30 is rotated in the rotation direction θ2, the arm member 51 is swung about the one end side thereof in the swing direction ω1 by the projection 52 of the arm member 51 coming into contact with the first switching slope portion 53 of the rotary body 30 during the rotation, and the projection 52 is subsequently guided by the guide portion 56, whereby the projection 52 is brought into contact with the stopper portion 54. When the projection 52 is brought into contact with the stopper portion 54, the rotary holder device 1 comes into the terminal holder state where the second opening 33a of the second holder portion 33 is opened through the opening portion 14 of the vehicle interior member 10. In this case, the switching knob 38 is housed in the spherical space 15, and the rotary body 30 is restricted from rotating back in the rotation direction θ1 to the cup holder state side.

In the terminal holder state, the first opening 32a is hidden within the spherical space 15, and the peripheral edge of the first opening 32a is not exposed to the outside. Thus, even when the shape of the peripheral edge of the first opening 32a is a shape that meets the internal projection requirement, the design of the rotary holder device 1 in the terminal holder state is prevented from being impaired. In addition, the bottom surface and the side surface of the holding space 32s of the first holder portion 32 are design surfaces with which a beverage container to be held is brought into contact, and are portions that are likely to be damaged due to the contact. In the terminal holder state, the first holder portion 32 is housed in the spherical space 15, and the design surfaces of the holding space 32s of the first holder portion 32 are not exposed to the outside. Thus, preventive measures for damage do not need to be taken against the design surfaces of the holding space 32s of the first holder portion 32, and the flexibility in configuration of the design surfaces is increased.

As described above, in the rotary holder device 1, the rotary body 30 has the first holder portion 32 and the second holder portion 33 which are provided at the rotation angle positions different from each other. The first holder portion 32 forms the holding space 32s in which a beverage container, which is an object to be held, is held. The second holder portion 33 forms the holding space 33s in which a portable terminal, which is an object to be held, is held. The cup holder state where the circular first opening 32a of the first holder portion 32 is opened through the opening portion 14 to allow a beverage container to be held and the terminal holder state where the rectangular second opening 33a of the second holder portion 33 is opened through the opening portion 14 to allow a portable terminal to be held, are selectively switched by rotating the rotary body 30.

According to this structure, the first holder portion 32 for a beverage container and the second holder portion 33 for a portable terminal do not need to be disposed on the upper panel, to which the rotary holder device 1 is provided, so as to be aligned with each other in the horizontal direction, and an excessive increase in the area occupied by both holder portions on the upper panel is inhibited.

The first holder portion 32 has a shape conforming to the outer shape of a beverage container which is an object to be held. Thus, the beverage container is inserted into the first opening 32a of the first holder portion 32 and held in the holding space 32s. In addition, the second holder portion 33 has a shape conforming to the outer shape of a portable terminal which is an object to be held. Thus, the portable terminal is inserted into the second opening 33a of the second holder portion 33 and held in the holding space 33s, and further the portable terminal is held with good appearance. Accordingly, the portable terminal does not need to be inserted into the first holder portion 32 for a beverage container and leaned against the first holder portion 32, and the portable terminal is stably held.

Therefore, with the rotary holder device 1, two types of objects to be held, that is, a beverage container and a portable terminal, are appropriately held, and the convenience is improved. In addition, the space for stably holding both the beverage container and the portable terminal, which are objects to be held, is saved.

The second holder portion 33 has the restriction portion 33d which restricts the bottom portion of a portable terminal, which is inserted into the second opening 33a and brought into contact with the second bottom wall 33b, from sliding and moving relative to the second bottom wall 33b. Thus, the bottom portion of a portable terminal held in the second holder portion 33 is prevented from excessively sliding in the horizontal direction in a state where the portable terminal is leaned against the second holder portion 33. Accordingly, the back surface or the front surface of the portable terminal held in the second holder portion 33 is prevented from being greatly separated from the second side wall 33c, and power is constantly and efficiently supplied from the power feeder 70 to the portable terminal.

The first bottom wall 32b of the first holder portion 32 and the second side wall 33c of the second holder portion 33 are shared walls. That is, the first bottom wall 32b is a support wall that serves as the second side wall 33c and supports the back surface or the front surface of a portable terminal held in the second holder portion 33 in the terminal holder state. Thus, the structure for holding each of two types of objects to be held, that is, a beverage container and a portable terminal, is simplified.

The arrangement angle difference a between the first holder portion 32 and the second holder portion 33 provided in the rotary body 30 is equal to or less than 90° with the horizontal axis C as a center. Thus, when the power feeder 70 is disposed at the back surface side of the first bottom wall 32b opposite to the front surface side of the first bottom wall 32b with which the bottom portion of a beverage container is brought into contact, the power feeder 70 is prevented from being exposed to the front surface side of the second side wall 33c with which the back surface or the front surface of a portable terminal is brought into contact, in the terminal holder state, and both the beverage container and the portable terminal are appropriately held.

The power feeder 70 is disposed at the back surface side, of the second side wall 33c of the second holder portion 33, opposite to the front surface side thereof with which the back surface or the front surface of a portable terminal is brought into contact. The power feeder 70 wirelessly supplies power to a portable terminal held in the second holder portion 33. Thus, the portable terminal held in the second holder portion 33 is charged by using the power feeder 70.

The rotary body 30 has the swinging member 39a which swings so as to open and close the second opening 33a, and the first biasing member 39b which generates biasing force that biases the swinging member 39a in the direction in which the second opening 33a is closed. With this structure, by the swinging member 39a advancing or retracting in accordance with the width of a portable terminal inserted into the second opening 33a, force pressing toward the second side wall 33c side is provided to the portable terminal. Thus, the portable terminal held in the second holder portion 33 is held between the second side wall 33c and the swinging member 39a. Accordingly, the back surface or the front surface of the portable terminal held in the second holder portion 33 is prevented from being separated from the second side wall 33c, and power is constantly and efficiently supplied from the power feeder 70 to the portable terminal.

Furthermore, with the above structure, the second opening 33a is closed by the swinging member 39a due to the biasing force of the first biasing member 39b in a normal state. Thus, in the cup holder state, the second opening 33a is prevented from being maintained in an opened state, and a gap extending from the holding space 32s of the first holder portion 32 to the spherical space 15 between the side wall member 12 and the rotary body 30 is prevented from being formed. Therefore, an object within the holding space 32s is inhibited from falling through the second opening 33a into the spherical space 15.

In the rotary holder device 1, the opening device 40 has the second biasing member 41 which generates biasing force that biases the rotary body 30 in the rotation direction θ1 from the terminal holder state side to the cup holder state side. In the terminal holder state where the second opening 33a of the second holder portion 33 is opened through the opening portion 14, when an occupant presses the front surface of the second holder portion 33 (specifically, the operation mark portion 35) downward, the rotary body 30 is rotated in the rotation direction θ1 relative to the vehicle interior member 10 by the biasing force of the second biasing member 41, whereby the rotary holder device 1 comes into the cup holder state where the first holder portion 32 is opened through the opening portion 14. Therefore, to switch the rotary holder device 1 from the terminal holder state to the cup holder state, the lid member 30b of the rotary body 30 only needs to be pressed downward in the terminal holder state, and thus the occupant brings the rotary holder device 1 into the cup holder state by a simple operation with one hand.

In the rotary holder device 1, the switching knob 38 which assists in performing an operation of rotating the rotary body 30 in the rotation direction θ2 to the terminal holder state side from the cup holder state is mounted on the rotary body 30. The switching knob 38 is provided on the peripheral edge of the first opening 32a at the rotation direction θ1 side with respect to the first holder portion 32 so as to project outward, is housed in the spherical space 15, which is located below the opening portion 14, in the terminal holder state, and projects above the opening portion 14 in the cup holder state. According to this structure, to switch the rotary holder device 1 from the cup holder state to the terminal holder state, the switching knob 38 only needs to be pressed in the rotation direction θ2, and thus, owing to the presence of the switching knob 38, the occupant brings the rotary holder device 1 into the terminal holder state by a simple operation with one hand.

The switching knob 38 is mounted on the rotary body 30 so as to be swingable about the axis parallel to the horizontal axis C and is biased to the center side of the first opening 32a in the direction in which a part of the first opening 32a is closed. With this structure, force pressing toward the side in the circumferential direction opposite to the end side of the switching knob 38 across the first opening 32a is provided to a beverage container inserted into the holding space 32s of the first holder portion 32. In this case, the beverage container inserted into the first holder portion 32 is held between the switching knob 38 and the first side wall 32c of the holding space 32s of the first holder portion 32. Thus, the beverage container held in the first holder portion 32 is brought into contact with the first side wall 32c of the holding space 32s, and this contact state is maintained. As a result, the beverage container held in the first holder portion 32 is restricted from moving in the radial direction within the holding space 32s and supported, and rattling of the beverage container is inhibited.

In the rotary holder device 1, the comb tooth portion 18 is provided on the inner surface of each of the side wall members 12 and 13 of the vehicle interior member 10, and the comb tooth portion 37 is provided on the outer surface of the rotary body 30 so as to correspond to each of the comb tooth portions 18 of the side wall members 12 and 13. The comb tooth portions 18 of the side wall members 12 and 13 and the comb tooth portions 37 of the rotary body 30 move relative to each other, while being in mesh with each other, during rotation of the rotary body 30 relative to the vehicle interior member 10. Each of the recesses 18a and the projections 18b of the comb tooth portions 18 and the projections 37a and the recesses 37b of the comb tooth portions 37 has a predetermined width corresponding to the size of a falling object that is to be an object to be scooped up.

With this structure, when an object falls from the opening portion 14 of the exposed member 11 of the vehicle interior member 10 into the spherical space 15 between the side wall members 12 and 13 and the rotary body 30, if the falling object has a size larger than the predetermined width, the falling object is caught between the comb tooth portion 18 at the vehicle interior member 10 side and the comb tooth portion 37 of the rotary body 30. Thus, the falling object falling from the opening portion 14 into the spherical space 15 is inhibited from falling further downward from the gap between the inner surface of the vehicle interior member 10 and the outer surface of the rotary body 30, and the caught falling object is scooped up during next rotation of the rotary body 30 and is taken up through the opening portion 14 by an occupant.

Figure 9:
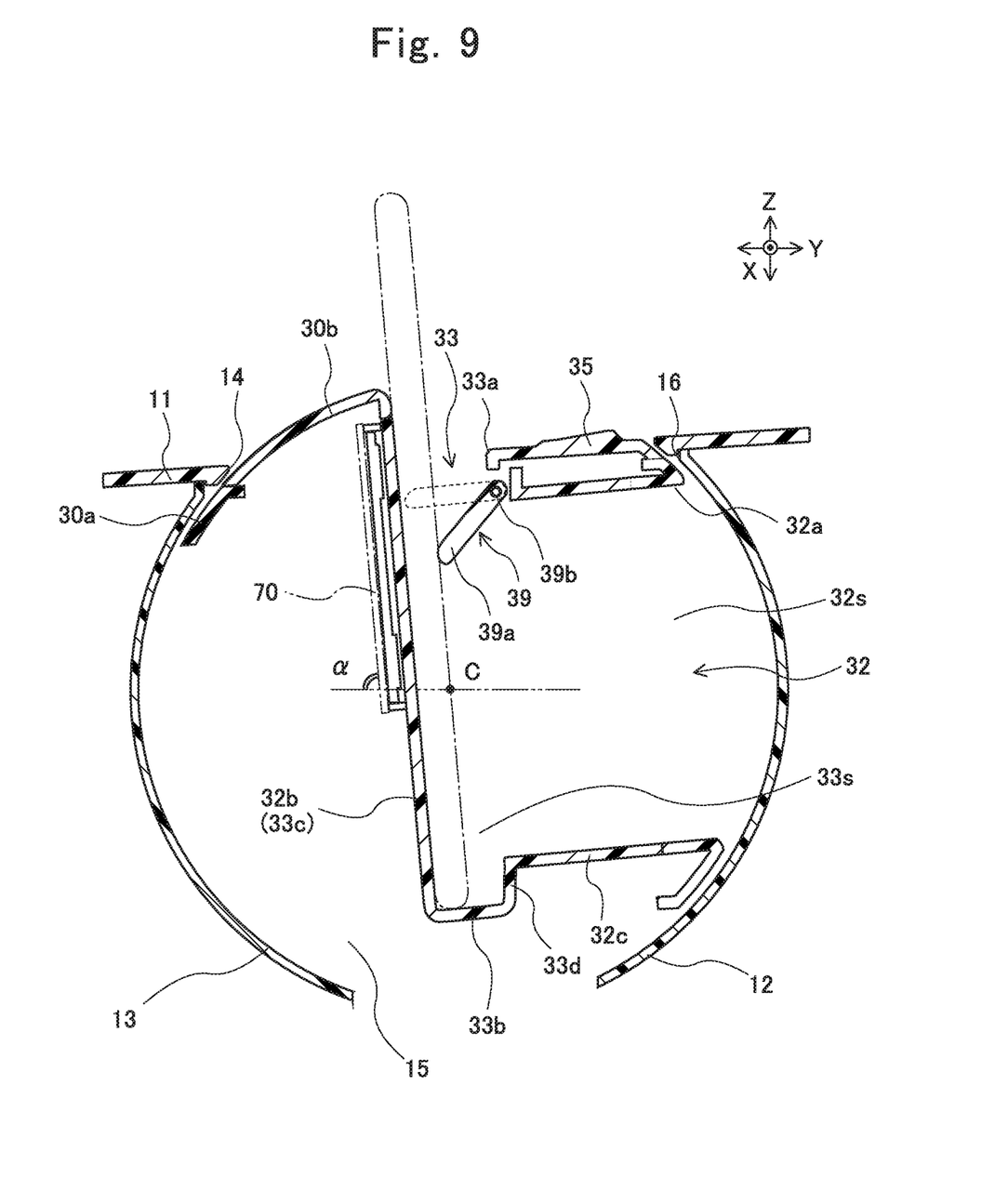
FIG. 9 shows a relationship between a vehicle interior member and a rotary body in a terminal holder state of a rotary holder device according to a modification.

Meanwhile, in the above embodiment, the lid member 30b having the second opening 33a formed therein is formed in a planar shape. However, the present invention is not limited thereto, and the lid member 30b may be formed so as to be convex upward as shown in FIG. 9. In particular, the second side wall 33c may extend to above the exposed member 11 of the vehicle interior member 10.

According to this modification, a further upper portion of the back surface or the front surface of a portable terminal which is an object to be held is also supported by the second side wall 33c. Thus, the stability of holding of the portable terminal is improved. In addition, by disposing the power feeder 70 at a higher position, for example, a high-height portable terminal having a charging unit located in an upper portion thereof is supplied with power using the power feeder 70 without lowering the position of the second bottom wall 33b, so that downward extension of the rotary holder device 1 for allowing the high-height portable terminal to be supplied with power is inhibited.

Figure 10:
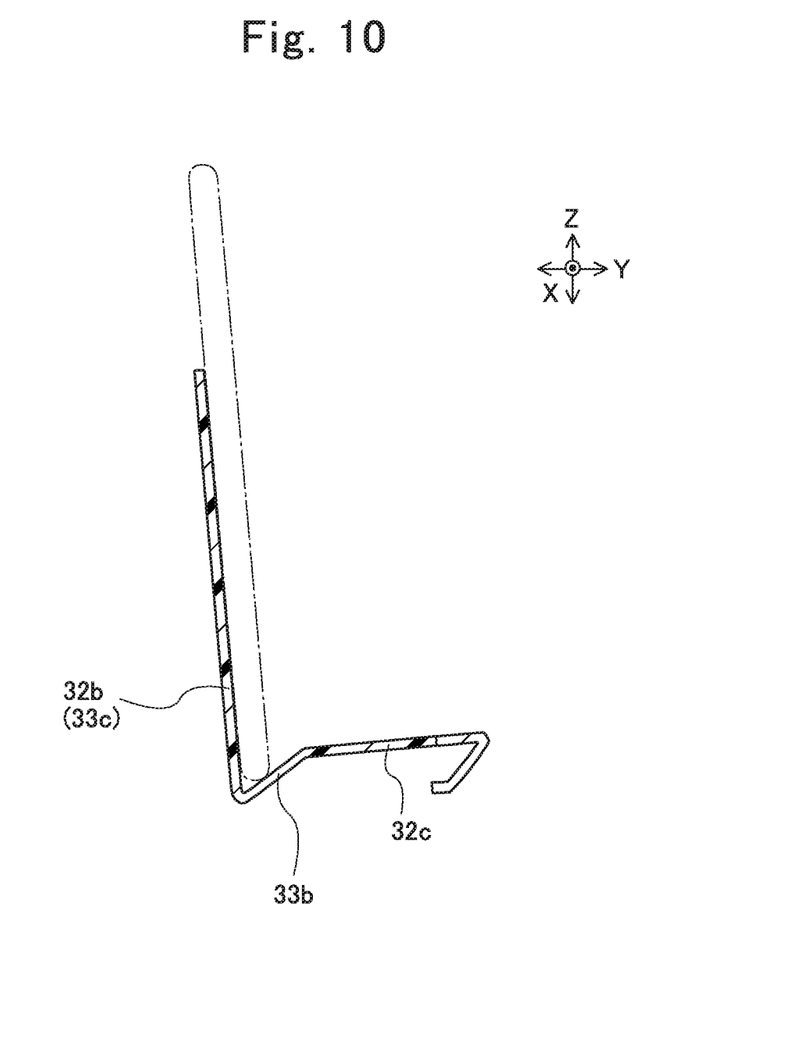
FIG. 10 illustrates a main part structure of a rotary body of a rotary holder device according to another modification.

In the above embodiment, the second bottom wall 33b of the second holder portion 33 is formed such that the wall surface thereof horizontally spreads in the terminal holder state. However, the present invention is not limited thereto, and the second bottom wall 33b may be formed such that the wall surface thereof is inclined relative to the horizontal direction in the terminal holder state as shown in FIG. 10. This inclination is formed such that the bottom portion of a portable terminal brought into contact with the second bottom wall 33b is moved to the second side wall 33c side due to the action of gravity. According to this modification, the back surface or the front surface of a portable terminal held in the second holder portion 33 is prevented from being separated from the second side wall 33c, and power is constantly and efficiently supplied from the power feeder 70 to the portable terminal.

In the above embodiment, the rotary body 30 has the restriction portion 33d which restricts the bottom portion of a portable terminal held in the second holder portion 33 from swinging and moving relative to the second bottom wall 33b, and the restriction portion 33d is a step formed between the second bottom wall 33b and the first side wall 32c. However, the present invention is not limited thereto, and the restriction portion 33d may be an anti-slide member fixed to the front surface of the second bottom wall 33b.

In the above embodiment, through one operation of pressing the lid member 30b of the rotary body 30 downward in the terminal holder state of the rotary holder device 1, the rotary body 30 rotates by the biasing force of the second biasing member 41 of the opening device 40 to bring the rotary holder device 1 into the cup holder state where the first opening 32a of the first holder portion 32 is opened through the opening portion 14.

However, the present invention is not limited thereto. Through one operation of pressing the rotary body 30 in the rotation direction θ2 in the cup holder state of the rotary holder device 1, the rotary body 30 may rotate by biasing force of a biasing member of a predetermined closing device to bring the rotary holder device 1 into the terminal holder state where the second opening 33a of the second holder portion 33 is opened through the opening portion 14. In addition, switching from the terminal holder state where the second opening 33a of the second holder portion 33 is opened through the opening portion 14 to the cup holder state where the first opening 32a of the first holder portion 32 is opened through the opening portion 14, and switching from the cup holder state to the terminal holder state may each be performed through one operation using a turnover spring.

The present invention is not limited to the embodiments and modifications described above, and various changes may be made without departing from the gist of the present invention.

This application claims priority on Japanese Patent Application No. 2019-077431 filed in Japan on Apr. 15, 2019, the entire contents of which are incorporated herein by reference.

The invention claimed is:

1. A rotary holder device comprising:
a vehicle interior member having an opening portion formed with a predetermined shape in an upper surface thereof; and
a rotary body mounted on the vehicle interior member so as to be rotatable about a horizontal axis extending in a horizontal direction,
wherein
the rotary body has a first holder portion and a second holder portion provided at rotation angle positions different from each other,
the first holder portion has a first opening formed in a shape corresponding to the predetermined shape, and a first bottom wall facing the first opening at a position at the horizontal axis side with respect to the first opening,
the second holder portion has a second opening formed in a rectangular shape, and a second bottom wall facing the second opening at a position at the horizontal axis side with respect to the second opening, and
in a state where the second opening is opened through the opening portion, the first bottom wall is a side support wall configured to support a back surface or a front surface of an object to be held inserted into the second opening and brought into contact with the second bottom wall.

2. The rotary holder device according to claim 1, wherein the second holder portion has a restriction portion configured to restrict a bottom portion of an object to be held inserted into the second opening and brought into contact with the second bottom wall, from moving relative to the second bottom wall.

3. The rotary holder device according to claim 1, wherein an arrangement angle difference between the first holder portion and the second holder portion provided in the rotary body is equal to or less than 90°.

4. The rotary holder device according to claim 1, further comprising a power feeder disposed at a back surface side of the first bottom wall opposite to a front surface side of the first bottom wall with which the back surface or the front surface of the object to be held is brought into contact, the power feeder being configured to wirelessly supply power to the object to be held.

5. The rotary holder device according to claim 1, wherein the rotary body has a pressing mechanism configured to press the object to be held inserted into the second opening, to a front surface side of the first bottom wall.

6. The rotary holder device according to claim 5, wherein the pressing mechanism has a swinging member configured to swing so as to open and close the second opening, and a first biasing member configured to generate biasing force that biases the swinging member in a direction in which the second opening is closed.

7. The rotary holder device according to claim 1, further comprising an opening device configured to, by an end portion, at one side in a rotation direction with respect to the second opening, of a rotary body being pressed downward in a state where the second opening is opened through the opening portion, rotate the rotary body to another side in the rotation direction to open the first opening through the opening portion.

8. The rotary holder device according to claim 7, wherein the opening device has a second biasing member engaged at one end portion thereof with the vehicle interior member and engaged at another end portion thereof with the rotary body, the second biasing member being configured to generate biasing force that biases the rotary body to the other side in the rotation direction.

9. The rotary holder device according to claim 1, further comprising a switching knob provided on a peripheral edge of the first opening at another side in a rotation direction so as to project outward and configured to assist in performing an operation of rotating the rotary body to one side in the rotation direction in a state where the first opening is opened through the opening portion.

10. A rotary holder device comprising:
a vehicle interior member having an opening portion formed with a predetermined shape in an upper surface thereof; and
a rotary body mounted on the vehicle interior member so as to be rotatable about a horizontal axis extending in a horizontal direction,
wherein
the rotary body has a first holder portion and a second holder portion provided at rotation angle positions different from each other,
the first holder portion has a first opening formed in a shape corresponding to the predetermined shape, and a first bottom wall facing the first opening at a position at the horizontal axis side with respect to the first opening,
the second holder portion has a second opening formed in a rectangular shape, and a second bottom wall facing the second opening at a position at the horizontal axis side with respect to the second opening, and
the second holder portion has a restriction portion configured to restrict a bottom portion of an object to be held inserted into the second opening and brought into contact with the second bottom wall, from moving relative to the second bottom wall.

11. A rotary holder device comprising:
a vehicle interior member having an opening portion formed with a predetermined shape in an upper surface thereof; and
a rotary body mounted on the vehicle interior member so as to be rotatable about a horizontal axis extending in a horizontal direction,
wherein
the rotary body has a first holder portion and a second holder portion provided at rotation angle positions different from each other,
the first holder portion has a first opening formed in a shape corresponding to the predetermined shape, and a first bottom wall facing the first opening at a position at the horizontal axis side with respect to the first opening, and
the second holder portion has a second opening formed in a rectangular shape, and a second bottom wall facing the second opening at a position at the horizontal axis side with respect to the second opening,
further comprising a switching knob provided Oil a peripheral edge of the first opening at another side in a rotation direction so as to project outward and configured to assist in performing an operation of rotating the rotary body to one side in the rotation direction in a state where the first opening is opened through the opening portion.

\* \* \* \* \*